(12) United States Patent
Koester et al.

(10) Patent No.: US 11,856,887 B2
(45) Date of Patent: Jan. 2, 2024

(54) BRUSH CUTTER HAVING LOCKING MECHANISM FOR CUTTER GUARD

(71) Applicant: Paladin Brands Group, Inc., Oak Brook, IL (US)

(72) Inventors: Jay Koester, Manchester, IA (US); Alan Janak, Lansing, MI (US)

(73) Assignee: Paladin Brands Group, Inc., New Britain, CT (US)

( * ) Notice: Subject to any disclaimer, the term of this patent is extended or adjusted under 35 U.S.C. 154(b) by 474 days.

(21) Appl. No.: 17/156,922

(22) Filed: Jan. 25, 2021

(65) Prior Publication Data

US 2021/0227746 A1 Jul. 29, 2021

Related U.S. Application Data

(60) Provisional application No. 62/966,345, filed on Jan. 27, 2020.

(51) Int. Cl.
*A01D 34/81* (2006.01)
*A01D 34/64* (2006.01)
*A01D 101/00* (2006.01)

(52) U.S. Cl.
CPC .............. *A01D 34/81* (2013.01); *A01D 34/64* (2013.01); *A01D 2101/00* (2013.01)

(58) Field of Classification Search
CPC ..... A01D 34/81; A01D 34/64; A01D 2101/00
USPC .......................................................... 56/17.4
See application file for complete search history.

(56) References Cited

U.S. PATENT DOCUMENTS

| | | | |
|---|---|---|---|
| 4,445,312 A | 5/1984 | Cartner | |
| 5,195,311 A | 3/1993 | Holland | |
| 5,392,593 A | 2/1995 | Emery | |
| 5,657,620 A | 8/1997 | Thagard et al. | |
| 7,185,479 B1* | 3/2007 | Cartner | A01D 34/828 56/320.1 |
| 7,340,877 B2 | 3/2008 | Anderson et al. | |
| 7,743,595 B2 | 6/2010 | Savoie et al. | |
| 8,857,144 B2 | 10/2014 | Koester | |
| 9,574,383 B1 | 2/2017 | Walker et al. | |
| 2009/0193778 A1 | 8/2009 | Hofmann et al. | |
| 2009/0193779 A1 | 8/2009 | Hofmann et al. | |
| 2013/0081370 A1* | 4/2013 | Koester | A01D 34/81 56/255 |
| 2019/0387675 A1 | 12/2019 | Finlayson et al. | |

* cited by examiner

*Primary Examiner* — Mahmoud Gimie
(74) *Attorney, Agent, or Firm* — Nyemaster Goode, P.C.

(57) ABSTRACT

A brush cutter device having a latch assembly for securing a movable cutter guard in a closed position when the brush cutter is tilted beyond a predetermined angle. The guard is combined with a side of the housing and movable between a closed position and an open position. A latch is combined with a portion of the housing and is capable of moving between a retracted position wherein the guard is able to move freely between its open position and its closed position and an engaged position wherein the latch prevents the guard from moving to its open position. Upon tilting the brush cutter beyond a certain angle, gravity acts on the latch causing it to move from its retracted position to its engaged position. The guard would move from its closed position to its open position upon tilting the brush cutter beyond a certain angle, however, the latch is moved beyond its pivot point before the guard moves beyond its pivot point to lock the guard in its closed position.

21 Claims, 10 Drawing Sheets

BRUSH CUTTER HAVING LOCKING MECHANISM FOR CUTTER GUARD

This application claims priority to and benefit of U.S. Provisional Patent Application Ser. No. 62/966,345, filed on Jan. 27, 2020, entitled "Brush Cutter Having Locking Mechanism for Cutter Guard," the disclosure of which is hereby incorporated herein by reference in its entirety.

BACKGROUND

Mowing, felling, and mulching operations are often performed using land clearing devices such as brush cutters. Brush cutters are typically attachments adapted to be fastened to and powered by prime mover vehicles such as excavators, tractors, skid-steers, or other suitable machines. Brush cutters include one or more rotating cutting members such as blades adapted to cut grass, shrubs, small trees, and other types of brush. The cutting members may be powered by any suitable means, including gasoline/diesel engines and hydraulic motors.

Brush cutters typically have a housing over the cutting members to help prevent injuries which may be caused by the spinning cutting members themselves or by debris being flung from the cutting members. Some brush cutters have guards adapted to move between a closed position and an open position to expose the blade(s) during certain cutting operations. For example, it may be desirable to open the guard and expose the rotating member(s) when cutting trees because the brush cutter is not able to be placed over the top of most trees and because cutting through trees at their base is faster than trying to mulch an entire tree from its top down. In most cases, the force of the guard against the object (e.g. tree) is used to move the guard from its closed position to its open position. Gravity resets the guard to its closed position when the guard is no longer pressed against the object. Some brush cutters use linkage assemblies such as the one disclosed in U.S. Pat. No. 8,857,144 (Koester), which is expressly incorporated by this reference, to move the guard to its open position.

In many brush cutters the movable guard is positioned at the leading edge of the brush cutter's housing. When attached to prime movers such as skid steer loaders, the brush cutter's leading edge would be forward in relation to the operator. However, brush cutters adapted to be attached to excavators often have the movable guard on one of the sides of the housing since the excavator's dipper stick typically rotates around the cab to provide sideways movement to the brush cutter attachment. Excavator operators are often tempted to tilt the brush cutter up and backward during cutting operations to cut sides of trees when only the branches need to be cleared from obstructing areas such as roadways or utility right of ways. This type of operation where the cutter deck is positioned at an angle from horizontal such that gravity allows the guard to open without being acted upon by a tree or branch can prevent the guard from controlling cutting debris and significantly increase the size of the debris field.

There is therefore a need for an improved brush cutter which overcomes these and other drawbacks in the prior art.

SUMMARY

One aspect of the invention relates to a brush cutter device. The brush cutter device includes a connection assembly for connecting the brush cutter to a prime mover vehicle, such as an excavator. The brush cutter further includes a motor or other means for actuating at least one cutting member, a housing generally covering the cutting member(s), and a cutter guard. The cutter guard is combined with a side of the housing and movable between a closed position and an open position. In its closed position, the cutter guard at least partially shields the cutting member(s) to help prevent debris from being thrown outward from the brush cutter. In the guard's open position, the cutting member(s) are exposed to allow the cutter(s) to perform certain land clearing operations. In one embodiment, the guard is moved from its closed position to its open position when the guard is pushed or bumped against an object such as a tree. The guard falls back to its closed position when force is no longer present between the guard and the object and gravity is allowed to pull the guard back closed. A latch assembly is combined with a portion of the housing. The latch assembly includes a latch capable of moving between a retracted position wherein the guard is able to move freely between its open position and its closed position and an engaged position wherein the latch prevents the guard from moving from its closed position to its open position. In one embodiment the latch uses gravity to move between its retracted position and its engaged position. The latch has a center of mass and a pivot point. Upon tilting the brush cutter beyond a certain angle (the latch's pivot point), gravity acts on the latch causing it to pivot about an axis from its retracted position to its engaged position. The guard also has a center of mass and a pivot point. Without the latch the guard would move from its closed position to its open position upon tilting the brush cutter beyond a certain angle (the guard's pivot point), however, the latch's center of mass is such that it moves beyond its pivot point before the guard moves beyond its pivot point. Thus, the latch is already in its engaged position before gravity acts to open the guard. The latch engages to lock the guard in its closed position even if the brush cutter is tilted beyond its pivot point where gravity would otherwise cause the guard to move to its open position.

Another aspect of the invention relates to a method of using a brush cutter. The method includes taking a brush cutter device having a connection assembly for connecting the brush cutter to a prime mover vehicle, a motor or other means for actuating at least one cutting member, a housing generally covering the cutting member(s), and a cutter guard. The cutter guard is combined with a side of the housing and movable between a closed position and an open position. The guard has a center of mass and a pivot point. The pivot point of the guard is reached upon tilting the brush cutter a first angle relative to horizontal. A latch assembly is combined with a portion of the housing. The latch assembly includes a latch capable of moving between a retracted position wherein the guard is able to move freely between its open position and its closed position and an engaged position wherein the latch prevents the guard from moving to its open position. The latch has a center of mass and a pivot point. The pivot point of the latch is a second angle relative to horizontal which is less than the first angle (pivot point of the guard). The method further includes tilting the brush cutter up and backward (towards the operator) until the latch moves beyond its pivot point from its retracted position to its engaged position where it engages a portion of the guard to secure the guard in its closed position even if the brush cutter continues to tilt beyond the pivot point of the guard. The brush cutter may be tilted toward being level with the ground to move the latch back to its retracted position thereby unlocking the guard.

DETAILED DESCRIPTION

Figure 1:
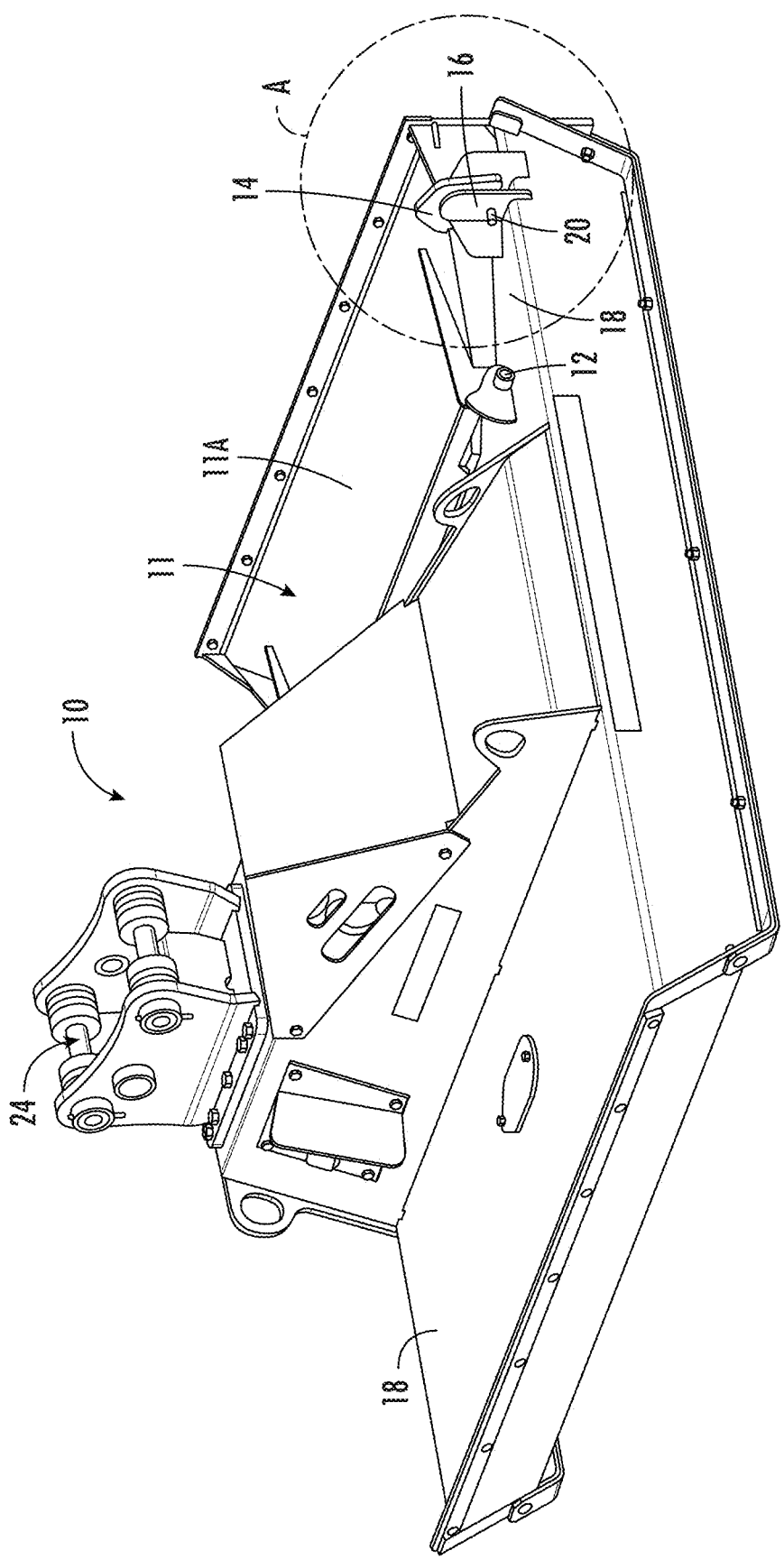
FIG. 1 is a perspective view of the brush cutter with the guard in the closed position.
Figure 2:
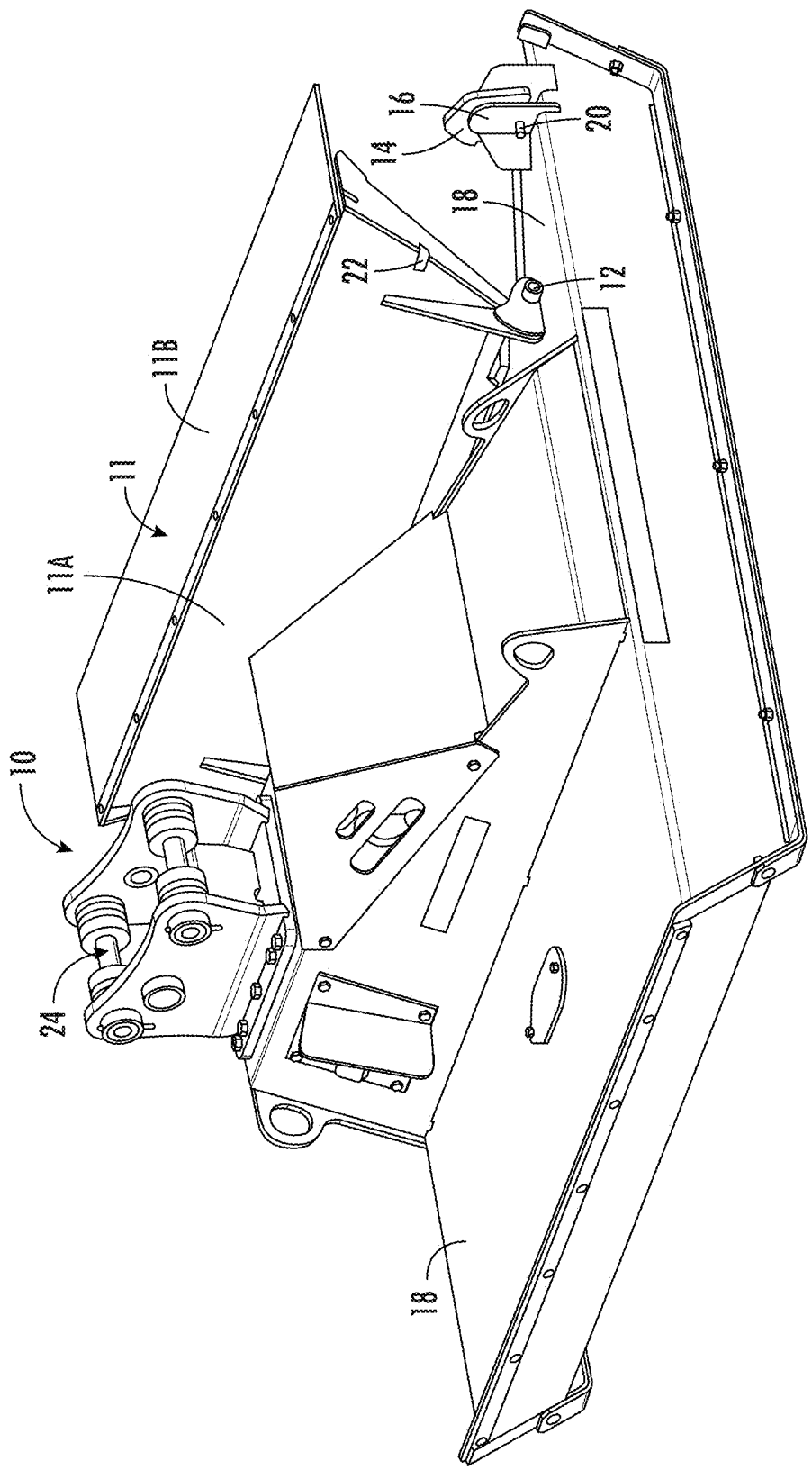
FIG. 2 is a perspective view of the brush cutter with the guard in the open position.
Figure 3:
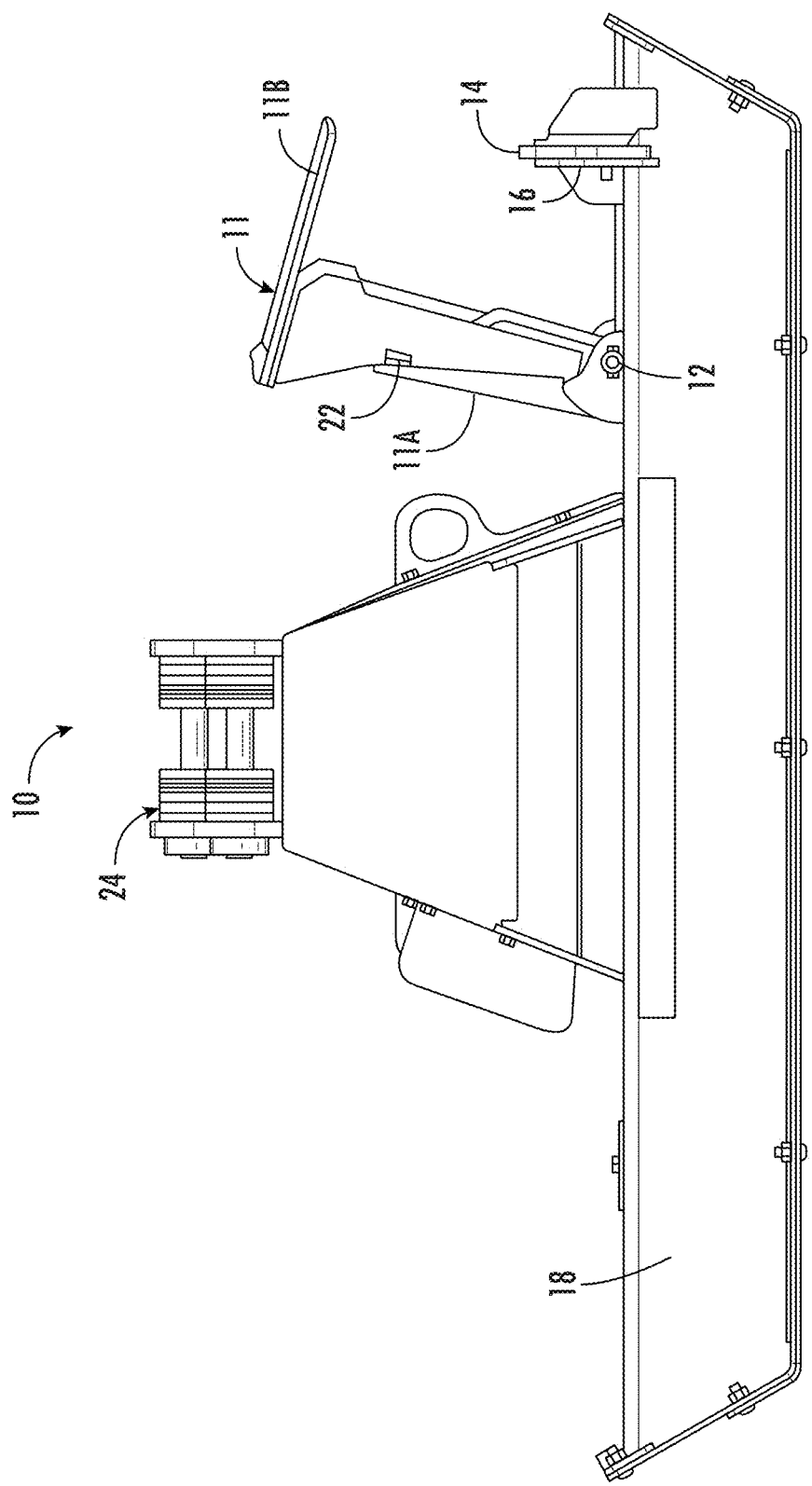
FIG. 3 is a front view of the brush cutter.

The invention relates to a brush cutter device 10 having a latch assembly for securing a movable guard 11 in a closed position when the brush cutter 10 is tilted beyond a predetermined angle. As shown in FIGS. 1-3, the brush cutter 10 generally includes a connection assembly 24 for attaching the brush cutter 10 to a prime mover vehicle, such as the dipper stick of an excavator. The prime mover vehicle is configured to tilt the brush cutter 10 forward and backward around a tilt axis that is generally perpendicular to the direction of reach of the dipper stick. The brush cutter 10 further includes an engine, motor, or other means for rotating at least one tooth, chain, knife, blade, or other type of cutting member 22. Any suitable engine or motor may be used to actuate the cutting member(s) 22. In one embodiment the brush cutter 10 includes a hydraulic motor actuated by the hydraulic system of the excavator or other prime mover vehicle. A housing 18 generally covers the top and sides of the cutting member(s) 22 to help prevent unintentional contact with the cutting member(s) 22 and also help provide control of debris being created by the brush cutter 10. The brush cutter 10 also includes a movable cutter guard 11 on one of its sides. The cutter guard 11 may be combined with any of the sides of the brush cutter 10, however, as explained above, brush cutters 10 for use with excavators typically have movable guards 11 on a side (as opposed to the front or back, where "front" is the side farthest from the operator) of the brush cutter 10 since excavators typically move the brush cutter 10 side-to-side instead of forward and backward. The cutter guard 11 may have any suitable configuration. In the embodiment shown in the figures, the cutter guard 11 has a top portion 11A and a side portion 11B.

Figure 6:
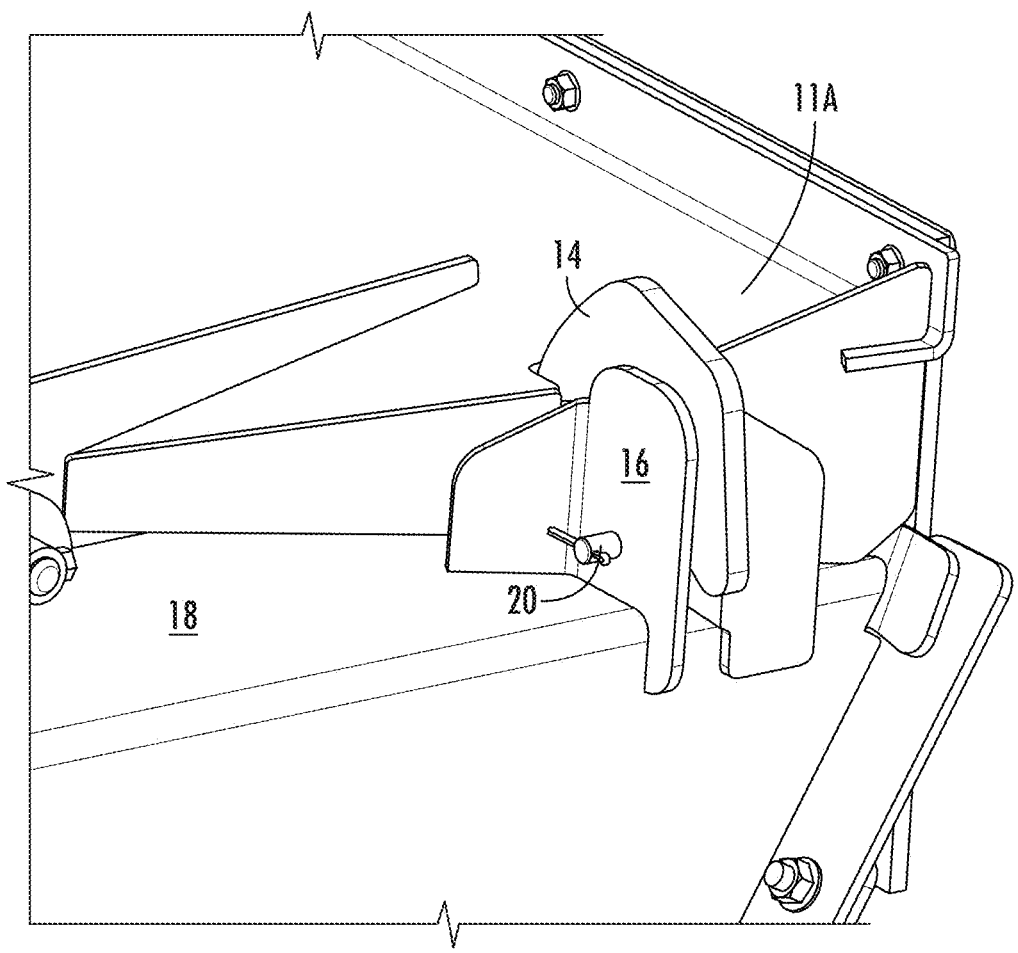
FIG. 6 is a detail view taken from area A in FIG. 1.
Figure 8:
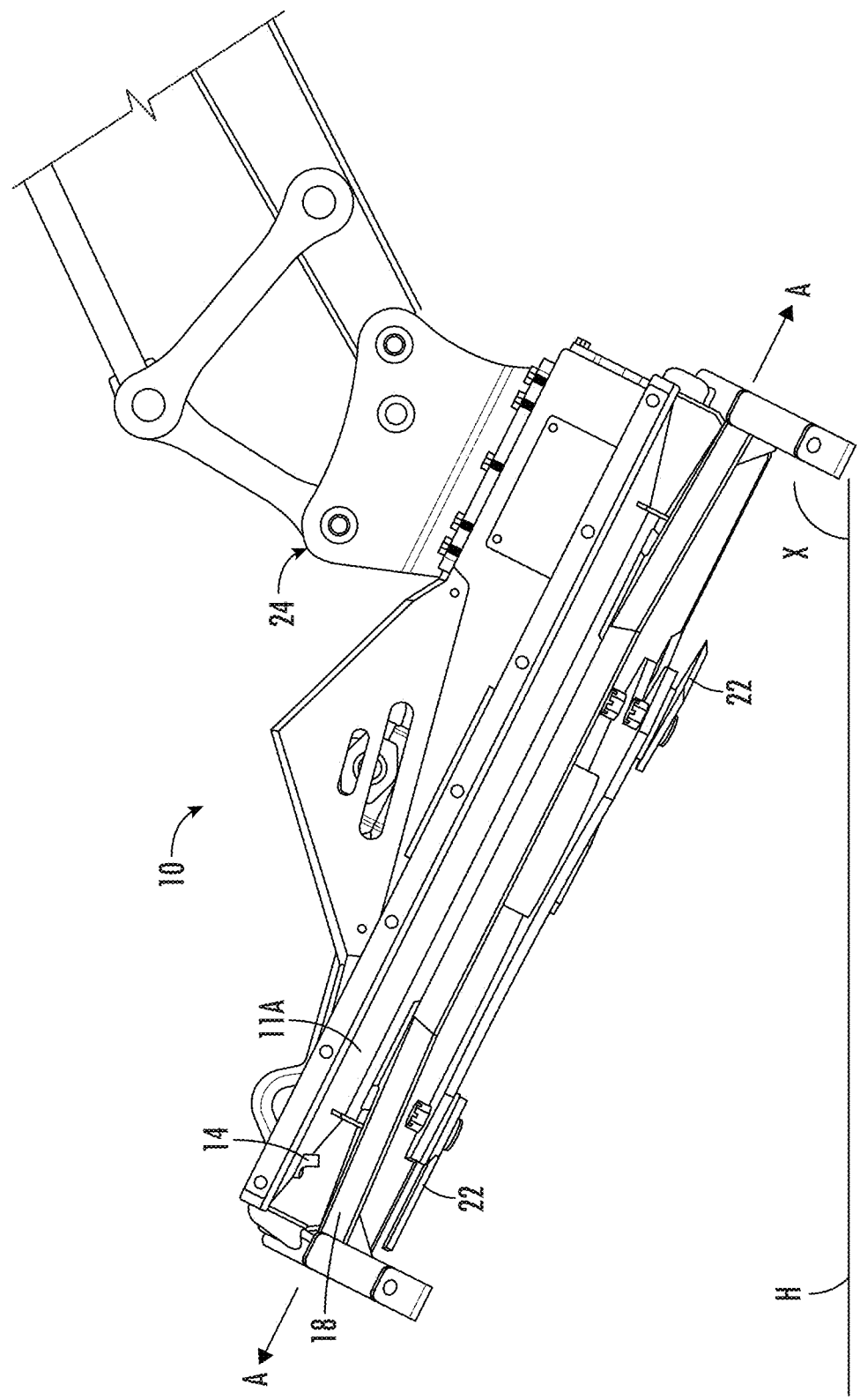
FIG. 8 is a side view of the brush cutter positioned at an angle to the ground wherein the side portion of the guard has been removed for illustration purposes to show the latch in its engaged position.
Figure 9:
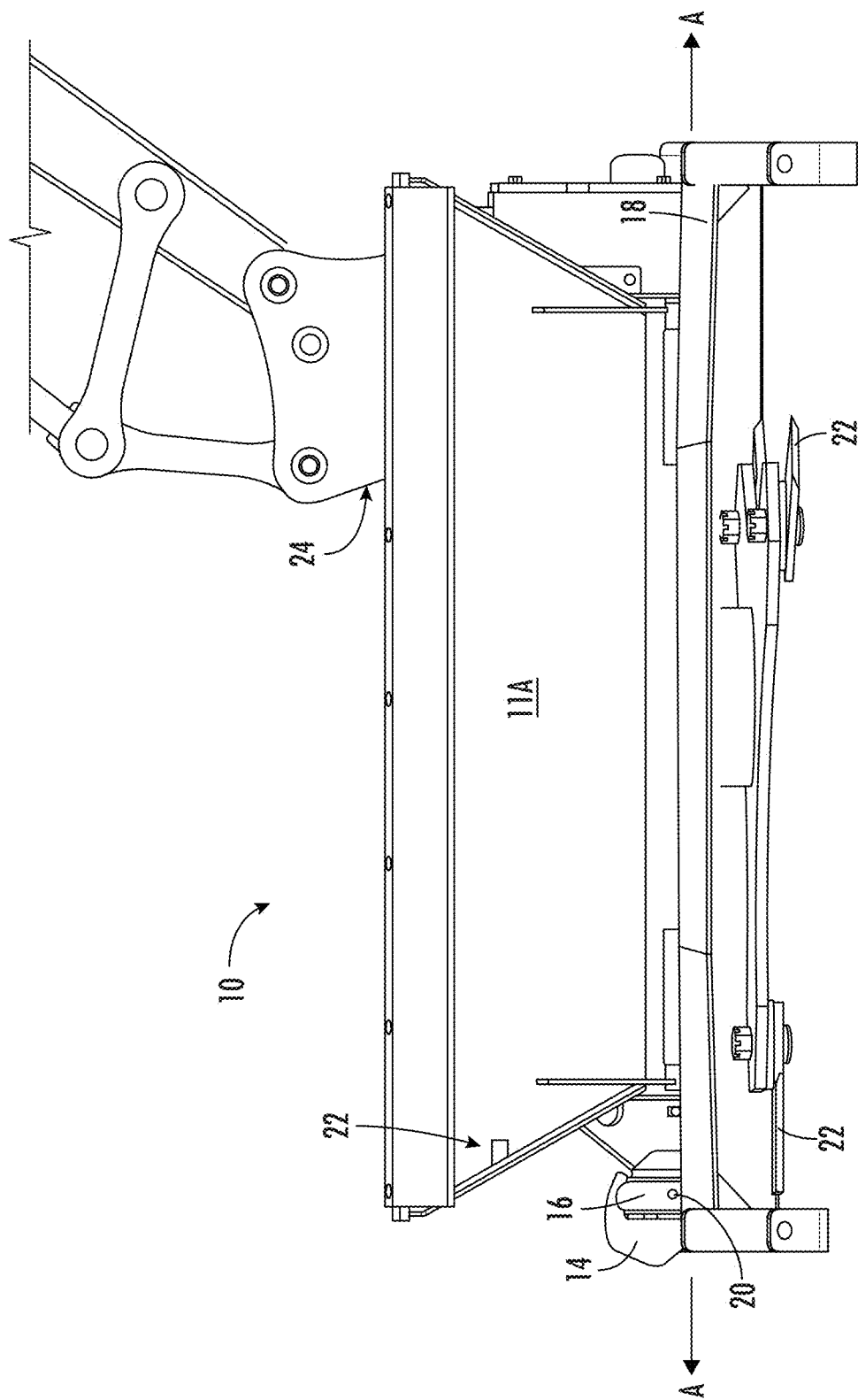
FIG. 9 is a side view of the brush cutter positioned level to the ground wherein a portion of the guard has been removed for illustration purposes to show the latch in its retracted position.

The cutter guard 11 is combined with a side of the housing 18 and movable between a closed position (shown in FIGS. 1, 6, and 8) and an open position (shown in FIGS. 2, 3, and 9). In its closed position, the guard 11 shields the cutting member(s) 22 to help prevent debris from being thrown outward from the brush cutter 10. In the guard's 11 open position, the cutting member(s) 22 are exposed to allow the cutting members(s) 22 to perform certain land clearing operations. For example, it may be desirable to expose the cutting member(s) 22 from a side of the housing 18 when cutting a tree or another tall or thick object so the cutting members 22 are able to cut through a side of the object instead of having to be placed over the top of the object. As shown in FIGS. 1-3, in one embodiment the guard 11 is combined with the housing 18 by a retaining member such as a pin 12. The pin 12 defines the guard pivot axis about which the guard 11 pivots between the open position and the closed position. In one embodiment, such as the embodiment shown in FIGS. 1-3, the guard pivot axis is perpendicular to the tilt axis of the brush cutter 10 such that the guard 11 is on a lateral side of the housing 18. In other embodiments the guard 11 is on the front side of the housing 18 such that the guard pivot axis is parallel to the tilt axis of the brush cutter 10.

In one embodiment, the guard 11 is moved from its closed position to its open position when the guard 11 is pushed or bumped against the object, as is known in the art. Some brush cutters use linkage assemblies such as the one disclosed in U.S. Pat. No. 8,857,144 (Koester) to move the guard 11 from its closed position to its open position. The guard 11 falls back to its closed position when force is no longer present between the guard 11 and the object thereby allowing gravity to pull the guard 11 back closed. Since the guard 11 is biased in its closed position by gravity, another way to open the guard 11 is to turn the guard 11 upside down or tilt the guard 11 at enough of an angle that its center of mass moves beyond its pivot point. As shown in the figures and described in more detail herein, a latch assembly is used to prevent the guard 11 from opening by gravity when tilted beyond a certain angle by the operator.

Figure 7:
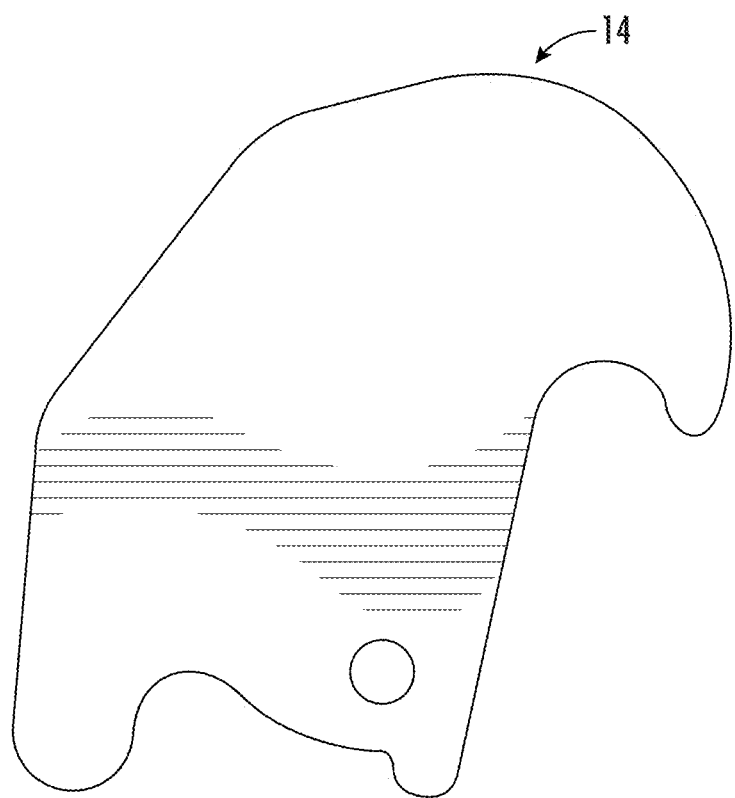
FIG. 7 is side view of the latch.

FIGS. 1-3 and 6 show the latch assembly combined with a portion of the housing 18. The latch assembly includes a latch 14 (shown by itself in FIG. 7) capable of moving between a retracted position wherein the guard 11 is able to move freely between its open position and its closed position and an engaged position wherein the latch 14 prevents the guard 11 from moving from its closed position to its open position. The guard 11 includes a proximal portion near the guard pivot axis and a distal portion near its outer edge (i.e., near the junction of the top wall 11A and the side wall 11B). In the embodiments shown, the latch assembly is positioned to engage the guard 11 closer to the distal portion than the proximal portion so that less force is needed to hold the guard 11 in its closed position.

The latch 14 has a center of mass and a pivot point. In one embodiment the latch 14 uses gravity acting on its mass to move between its retracted position and its engaged position. Upon tilting the brush cutter 10 beyond a certain angle (the latch's 14 pivot point), gravity acts on the latch 14 causing it to pivot about an axis from its retracted position to its engaged position. Moving the brush cutter 10 back toward being level causes the latch 14 to reach its pivot point again. Continuing to move the brush cutter 10 to an angle less than the certain angle (the latch's 14 pivot point) causes the latch 14 to move back to its retracted position.

The guard 11 also has a center of mass and a pivot point. The guard 11 would move from its closed position to its open position upon tilting the brush cutter 10 beyond a certain angle (the guard's 11 pivot point), however, the latch 14 is moved beyond its pivot point before the guard 11 is moved past its pivot point so the latch 14 moves to its engaged position before gravity acts on the guard 11. The latch 14 engages to lock the guard 11 in its closed position even if the brush cutter 10 is tilted beyond its pivot point where gravity would otherwise cause the guard 11 to move to its open position.

Figure 4:
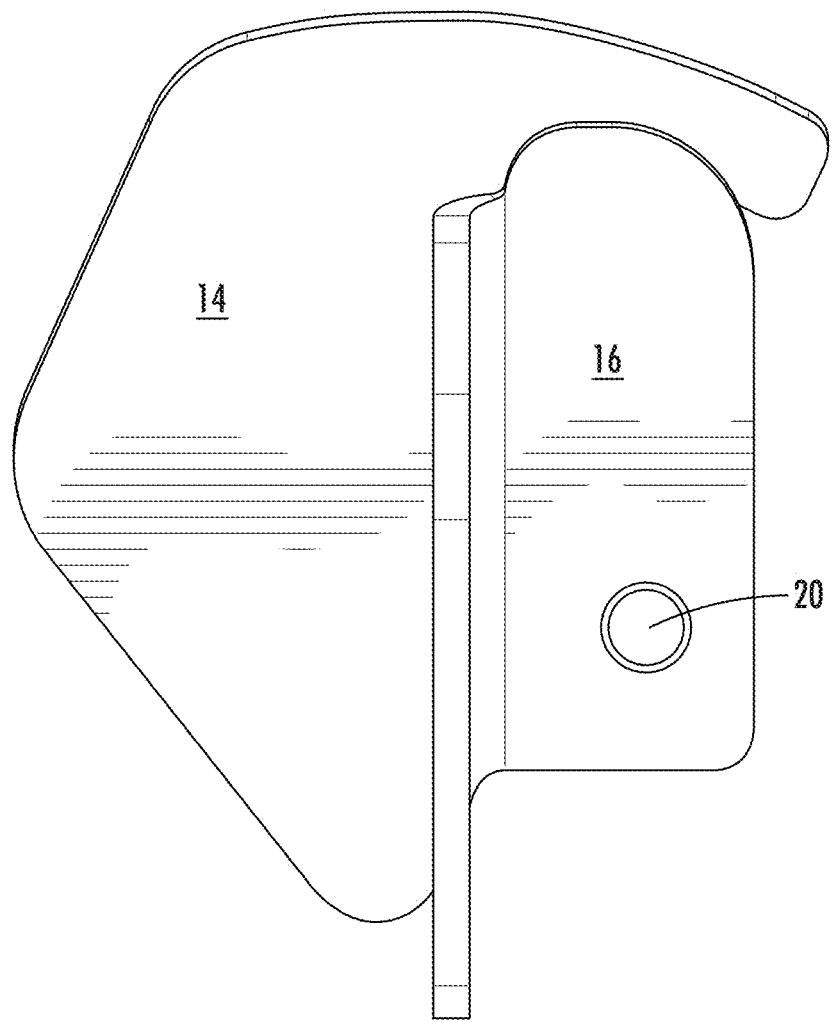
FIG. 4 is a side view of the latch assembly wherein the latch is in the retracted position.
Figure 5:
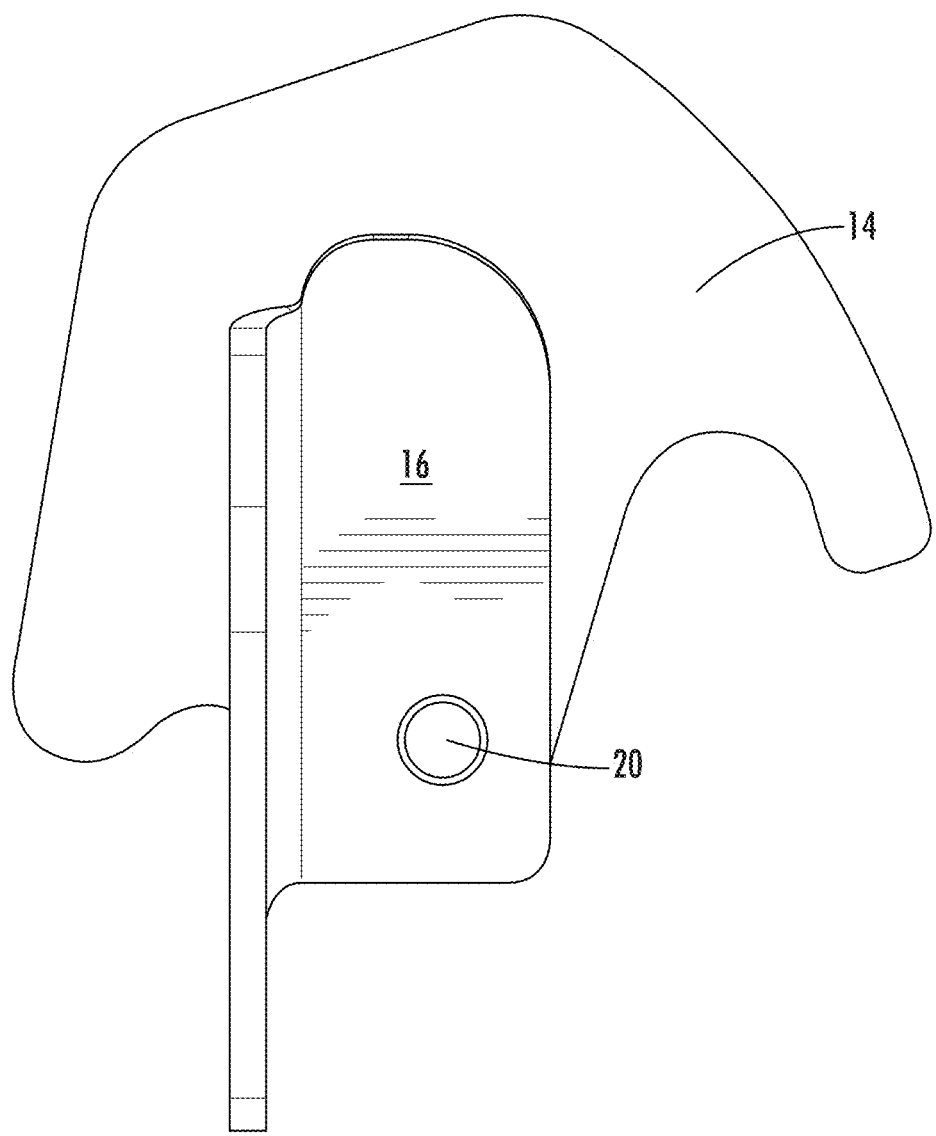
FIG. 5 is a side view of the latch assembly wherein the latch is in the engaged position.

FIGS. 4 and 5 show additional views of the latch assembly wherein the latch 14 is pivotally combined with a support structure such as hinge 16 by a member 20 such as a pin. The member 20 secures the latch 14 to the stationary hinge 16 and also provides a latch pivot axis about which the latch 14 pivots. In some embodiments, such as the one shown in FIGS. 1-3, the latch pivot axis is generally parallel to the tilt axis of the brush cutter 10. In this configuration gravity moves the latch 14 to the engaged position as the brush cutter 10 is tilted back toward the operator. The hinge 16 may be part of the housing 18 or it may be a separate member combined with the housing 18. FIG. 4 shows the latch 14 relative to the hinge 16 with the latch 14 in its retracted position and FIG. 5 shows the latch 14 relative to the hinge 16 with the latch 14 in its engaged position. The latch 14 may be any suitable shape, however, the center of mass is important to tip the latch 14 to its engaged position before the guard 11 moves beyond its pivot point. The latch's 14 pivot point may be adjusted by adding or removing weight from one side of the pivot axis or the other. In some embodiments the latch's pivot point is reached when the brush cutter's plane A (the general horizontal plane of the brush cutter's housing 18) is tilted at an angle between about five and twenty-five degrees from horizontal. In some embodiments the latch's pivot point is reached when the brush cutter's plane A is tilted at an angle between about ten and twenty degrees from horizontal. By contrast, it is estimated that the guard 11 does not reach its pivot point until the brush cutter 10 is tilted to more than about fifty degrees, and probably more than about sixty to seventy-five degrees from horizontal.

The latch assembly may be combined with the housing 18 in any suitable direction. However, since the latch 14 is preferably configured to pivot about a single axis, the latch 14 moves best in response to tilting the brush cutter 10 about an axis that is parallel to the latch's 14 pivot axis. In brush cutters 10 adapted for attachment to excavators, the pivot axis of the latch 14 is generally perpendicular to the reach of the stick (and thus generally parallel with the pivot axis of the brush cutter 10). Thus, as shown in the figures, the latch assembly is combined with the housing 18 to move to its engaged position when the brush cutter 10 is tiled backward wherein the housing 18 is tilted toward the operator thereby exposing the cutting members 22 outward from the excavator.

Figure 8A:
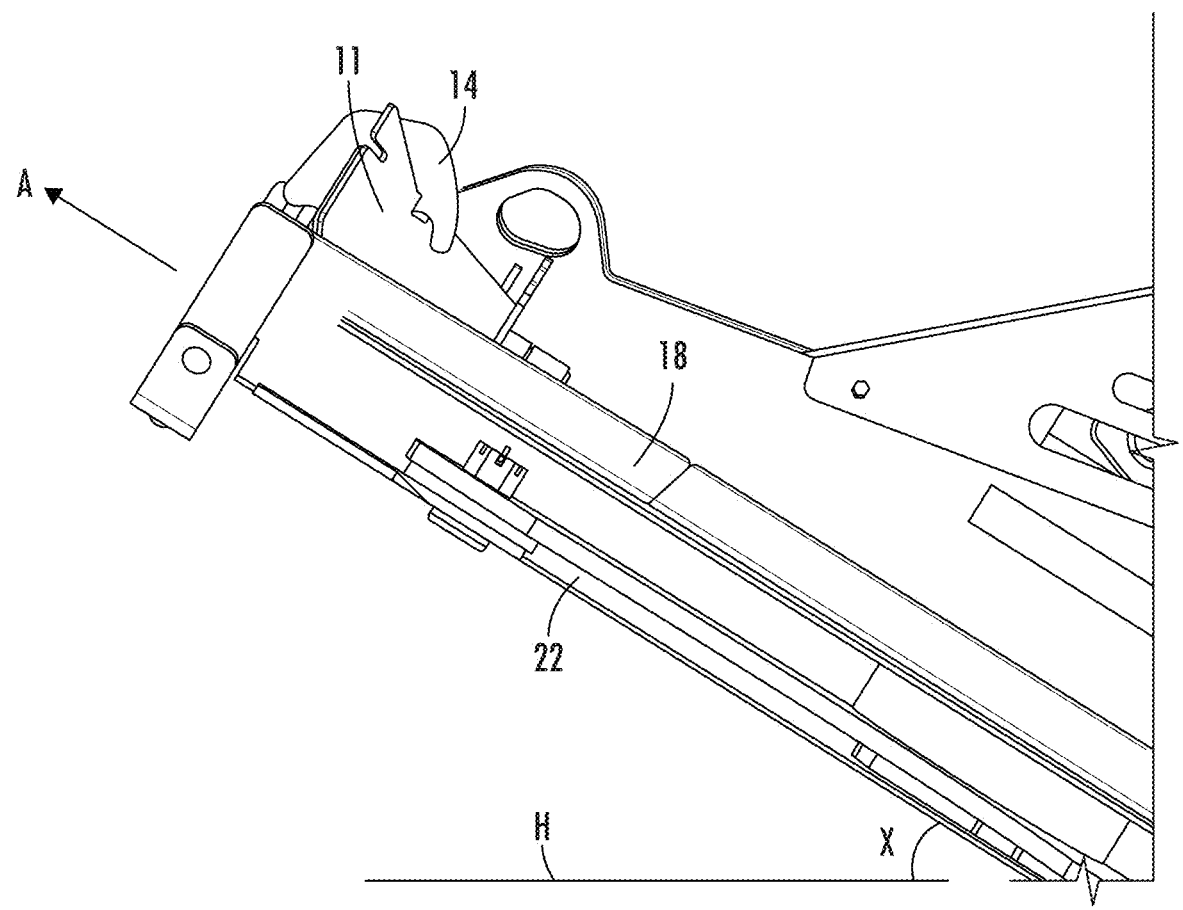
FIG. 8A is a view similar to FIG. 8, however, the side portion and the top portion of the guard have been removed to better show the latch engaging a portion of the guard.

FIG. 8 shows the brush cutter 10 combined with the stick of an excavator. The side wall 11B of the guard 11 has been removed for illustration purposes so the latch 14 is visible in the figure. In FIG. 8A both the top wall 11A and the side wall 11B have been removed for illustration purposes. The operator has positioned the brush cutter 10 so that its plane A is tilted backward about the tilt axis toward the operator an angle X relative to the horizontal ground surface H. As shown, the tilt angle X is greater than the pivot point of the latch 14 because the latch 14 has moved from its retracted position to its engaged position. In the embodiment shown, a portion of the latch 14 passes through an opening 22 in the top portion 11A of the guard 11 to secure the guard 11 in its closed position. In other embodiments the latch 14 engages a portion of the guard 11 but the guard 11 does not have an opening 22 for receiving a portion of the latch 14. For example, the latch 14 may engage a top portion 11A of the guard to hold it in the closed position.

FIG. 9 shows the brush cutter 10 combined with the stick of an excavator. Similar to FIG. 8, the side wall 11B of the guard 11 has been removed so the latch 14 is visible in the figure. The plane A of the brush cutter 10 is generally parallel with the horizontal ground surface H. In other words, the brush cutter 10 is not tilted to any significant degree. In this position the latch 14 is retracted thereby allowing the guard 11 to move to its open position when pushed against an object.

As described herein, one embodiment of the invention uses the force of gravity to move the latch 14 from its retracted position to its engaged position. Other embodiments include moving the latch between positions using a motor such as an electric motor or hydraulic motor. In this embodiment, a sensor is used to determine the angle that the brush cutter 10 is raised relative to horizontal. Upon reaching a predetermined angle, the sensor sends a signal to activate the motor to move the latch 14 to its engaged position. The predetermined angle is less than the pivot point of the guard 11. When the sensor determines that the brush cutter 10 has been moved back below the predetermined angle or height, then another signal would be sent to the motor to move the latch 14 back to its retracted position.

Having thus described the invention in connection with the preferred embodiments thereof, it will be evident to those skilled in the art that various revisions can be made to the preferred embodiments described herein with out departing from the spirit and scope of the invention. It is my intention, however, that all such revisions and modifications that are evident to those skilled in the art will be included with in the scope of the following claims.

What is claimed is as follows:

1. A brush cutter comprising:
   a housing;
   a cutting member combined with the housing;
   a guard combined with the housing, the guard having an open position wherein the cutting member is exposed for cutting operations and a closed position wherein the cutting member is at least partially shielded by the guard;
   a latch assembly having a latch movable between a retracted position wherein the guard is movable from the closed position to the open position and an engaged position wherein the latch prevents movement of the guard from the closed position to the open position;
   wherein the latch has a latch pivot point and is configured to move from the retracted position to the engaged position when the housing is tilted beyond the latch pivot point.

2. The brush cutter of claim 1 wherein the guard has a guard pivot point.

3. The brush cutter of claim 2 wherein the latch pivot point is reached when the housing is tilted a first angle relative to a horizontal ground surface and the guard pivot point is reached when the housing is tilted a second angle relative to the horizontal ground surface, wherein the first angle is less than the second angle so the latch moves to the engaged position before the guard reaches the guard pivot point.

4. The brush cutter of claim 3 wherein the first angle is between about five and twenty-five degrees and the second angle is more than fifty degrees.

5. The brush cutter of claim 1 wherein the guard includes a guard pivot axis, the latch includes a latch pivot axis, and the housing includes a tilt axis.

6. The brush cutter of claim 5 wherein the guard further comprises a proximal portion near the guard pivot axis and a distal portion near an outer edge, and the latch is configured to engage the guard at the distal portion.

7. The brush cutter of claim 5 wherein the tilt axis is parallel to the latch pivot axis.

8. The brush cutter of claim 5 wherein the tilt axis is perpendicular to the guard pivot axis.

9. The brush cutter of claim 1 wherein the latch moves between the retracted position and the engaged position by gravity.

10. The brush cutter of claim 1 wherein the latch moves between the retracted position and the engaged position by an electric or hydraulic motor or solenoid.

11. The brush cutter of claim 1 wherein the guard includes an opening configured to receive a portion of the latch.

12. The brush cutter of claim 1 further comprising a hydraulic motor operatively combined with the cutting member to rotate the cutting member relative to the housing.

13. A brush cutter comprising:
   a housing;
   a cutting member combined with the housing;
   a motor operatively combined with the cutting member to rotate the cutting member relative to the housing;
   a guard combined with the housing and configured to pivot about a guard pivot axis, the guard having an open position wherein the cutting member is exposed for cutting operations and a closed position wherein the cutting member is at least partially shielded by the guard, wherein the guard has a guard pivot point;
   a latch assembly having a latch configured to pivot about a latch pivot axis between a retracted position wherein the guard is movable from the closed position to the open position and an engaged position wherein the latch prevents movement of the guard from the closed position to the open position, wherein the latch has a latch pivot point and is configured to move from the retracted position to the engaged position upon tilting the housing about a tilt axis and beyond the latch pivot point;
   wherein the latch pivot point is reached upon tilting the housing a first angle relative to a horizontal ground surface and the guard pivot point is reached upon tilting the housing a second angle relative to the horizontal ground surface, wherein the first angle is less than the second angle so the latch moves to the engaged position before the guard reaches the guard pivot point.

14. The brush cutter of claim 13 wherein the first angle is between about five and twenty-five degrees and the second angle is more than fifty degrees.

15. The brush cutter of claim 13 wherein the latch moves between the retracted position and the engaged position by gravity.

16. The brush cutter of claim 13 wherein the latch moves between the retracted position and the engaged position by an electric or hydraulic motor or solenoid.

17. The brush cutter of claim 13 wherein the tilt axis is parallel to the latch pivot axis.

18. The brush cutter of claim 13 wherein the tilt axis is perpendicular to the guard pivot axis.

19. A method of using a brush cutter comprising:
   taking a brush cutter having a housing, a cutting member combined with the housing, a motor operatively combined with the cutting member, a guard combined with the housing about a guard pivot point and movable between an open position wherein the cutting member is exposed for cutting operations and a closed position wherein the cutting member is at least partially shielded by the guard, and a latch assembly having a latch movable about a latch pivot point between a retracted position wherein the guard is movable from the closed position to the open position and an engaged position wherein the latch prevents movement of the guard from the closed position to the open position;
   tilting the brush cutter from a first position wherein the latch is in the retracted position to a second position wherein the latch is in the engaged position and the housing is positioned at a first angle relative to a horizontal ground surface;
   tilting the brush cutter from the second position to a third position wherein the housing is positioned at a second angle relative to a horizontal ground surface which is larger than the first angle, beyond the guard pivot point, and wherein the latch engages the guard and prevents the guard from moving to the open position.

20. The method of claim 19 further comprising tilting the brush cutter back to the first position thereby causing the latch to move from the engaged position to the retracted position.

21. The method of claim 19 further comprising adding weight to the latch assembly to change the latch pivot point.

* * * * *